UNITED STATES PATENT OFFICE.

OLIVER LONG, OF BROOKLYN, AND PATRICK H. DRAKE, OF NEW YORK, N. Y.

IMPROVEMENT IN ADHESIVE SUBSTANCES.

Specification forming part of Letters Patent No. 192,773, dated July 3, 1877; application filed January 16, 1877.

*To all whom it may concern:*

Be it known that we, OLIVER LONG, of Brooklyn, in the county of Kings and State of New York, and P. H. DRAKE, of the city and county of New York, in said State, have invented a new and Improved Adhesive Substance and Process of Preparing the same, of which the following is a description:

This invention consists in a new adhesive substance formed by suitably dissolving the worn-out bodies of printers' inking-rollers, hitherto a waste article, and preferably adding a decoction of tobacco or some other substance, serving as a protection against insects.

Though applicable to other purposes, it is especially designed for use in the manufacture of a packing or lining consisting of paper or equivalent material, with chips or shavings of some soft elastic substance, such as cork, affixed to one or both sides, and forming the subject of Letters Patent No. 150,588, granted to the said Oliver Long May 5, 1874. It is particularly adapted to this because after drying it does not become so brittle as to crack and release the component parts of the packing or lining when rolled for the market. It is also especially applicable for this purpose, because it imparts to the packing or lining the property of protecting from moth or other insects carpets or the like in connection with which it may be used.

The process by which we prepare this adhesive substance consists in dissolving the worn-out bodies of printers' inking-rollers, composed of glue, glycerine, and molasses, or glue and molasses, in liquid, preferably water impregnated with tobacco or equivalent substance, by the aid of steam, hot water, or heat applied in any other suitable manner, and adding more and more of the dissolving liquid until the desired consistency is attained.

In carrying out the process we preferably break up the worn-out bodies of the rollers and dissolve them with liquid in a jacketed kettle, circulating through the jacket steam, hot water, or any other heating agent, and adding more and more of the solvent till the operation is finished.

The substance produced being composed of glue and molasses, or glue, glycerine, and molasses, is, as we have before intimated, elastic when dry, and, if impregnated with tobacco or its equivalent, has the property of rendering any article to which it is applied moth and insect proof.

By this invention, therefore, we utilize very advantageously an article which has hitherto been wasted and has even proved a source of annoyance.

What we claim as our invention, and desire to secure by Letters Patent, is—

An adhesive substance, consisting of a solution of worn-out printers' inking-rollers, composed of glue and molasses, or glue, glycerine, and molasses, with the addition preferably of tobacco, to render it insect proof, substantially as set forth.

OLIVER LONG.
P. H. DRAKE.

Witnesses:
WILLIAM P. WARD,
GEO. F. ROSS.